US012726462B2

(12) United States Patent
Thoria et al.

(10) Patent No.: US 12,726,462 B2
(45) Date of Patent: Sep. 1, 2026

(54) SYSTEMS AND METHODS FOR ACHIEVING MULTI-TENANCY ON AN EDGE ROUTER

(71) Applicant: Cisco Technology, Inc., San Jose, CA (US)

(72) Inventors: Samir Thoria, Saratoga, CA (US); Ajeet Pal Singh Gill, Fremont, CA (US); Srilatha Tangirala, San Jose, CA (US); Balaji Sundararajan, Fremont, CA (US); Nithin Bangalore Raju, Saratoga, CA (US); Vivek Agarwal, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 456 days.

(21) Appl. No.: 17/709,922

(22) Filed: Mar. 31, 2022

(65) Prior Publication Data

US 2023/0188502 A1 Jun. 15, 2023

Related U.S. Application Data

(60) Provisional application No. 63/265,463, filed on Dec. 15, 2021.

(51) Int. Cl.
*H04L 9/40* (2022.01)
*H04L 12/46* (2006.01)
*H04L 45/74* (2022.01)

(52) U.S. Cl.
CPC ...... *H04L 63/0272* (2013.01); *H04L 12/4641* (2013.01); *H04L 45/74* (2013.01)

(58) Field of Classification Search
None
See application file for complete search history.

(56) References Cited

U.S. PATENT DOCUMENTS 10,554,484 B2 * 2/2020 Chanda ............... H04L 63/1458
2002/0186698 A1 * 12/2002 Ceniza ............... H04L 61/2535
370/351

(Continued)

FOREIGN PATENT DOCUMENTS

CN 107547324 A * 1/2018
EP 2926251 A1 10/2015
EP 2945322 A1 11/2015
WO WO-2015180120 A1 * 12/2015 ............ H04L 29/06

OTHER PUBLICATIONS

International Search Report and Written Opinion of the International Searching Authority corresponding to International Application No. PCT/US2022/080878 dated Apr. 18, 2023, 15 pages.

(Continued)

*Primary Examiner* — Ario Etienne
*Assistant Examiner* — Mohammad Yousuf A. Mian
(74) *Attorney, Agent, or Firm* — Baker Botts L.L.P.

(57) ABSTRACT

In one embodiment, a method includes identifying, by a router, a first tenant. The first tenant is associated with a first tenant virtual private network (VPN). The method also includes determining, by the router, a mapping of the first tenant VPN to a first device VPN and generating, by the router, a first label representing the first device VPN. The method further includes adding, by the router, the first label to a first network packet and communicating, by the router, the first network packet with the first label to a controller.

20 Claims, 6 Drawing Sheets

(56) References Cited

U.S. PATENT DOCUMENTS

| | | | | |
|---|---|---|---|---|
| 2007/0234418 | A1* | 10/2007 | Song | H04L 12/4641 726/15 |
| 2013/0125124 | A1* | 5/2013 | Kempf | H04L 49/70 718/1 |
| 2014/0052877 | A1* | 2/2014 | Mao | H04L 61/5007 709/245 |
| 2014/0056298 | A1* | 2/2014 | Vobbilisetty | H04L 49/118 370/355 |
| 2016/0036774 | A1 | 2/2016 | Chong et al. | |
| 2016/0087941 | A1* | 3/2016 | Mudigonda | H04L 12/4641 726/12 |
| 2016/0315808 | A1 | 10/2016 | Saavedra | |
| 2018/0019927 | A1* | 1/2018 | Addanki | H04L 41/12 |
| 2019/0158371 | A1* | 5/2019 | Dillon | H04L 47/196 |
| 2019/0158397 | A1 | 5/2019 | Liu | |
| 2021/0112034 | A1 | 4/2021 | Sundararajan et al. | |
| 2021/0218672 | A1 | 7/2021 | Mackie et al. | |
| 2021/0288906 | A1* | 9/2021 | Wang | H04L 47/781 |

OTHER PUBLICATIONS

Cisco: "Cisco SD-WAN Design Guide", Sep. 1, 2020 (Sep. 1, 2020), XP093028951, Retrieved from the Internet: URL:https://web.archive.org/web/20210806133945if_/https://www.cisco.com/c/en/us/td/docs/solutions/CVD/SDWAN/cisco-sdwan-design-guide.pdf [retrieved on Mar. 3, 2023] p. 5-p. 26; p. 41-p. 89.

Del Piccolo Valentin et al: "A Survey of Network Isolation Solutions for Multi-Tenant Data Centers", IEEE Communications Surveys & Tutorials, vol. 18, No. 4, Apr. 20, 2016 (Apr. 20, 2016), pp. 2787-2821, XP011634927, DOI: 10.1109/CONST.2016.2556979 [retrieved on Nov. 18, 2016] the whole document.

Systems and Interfaces Configuration Guide, Cisco SD-WAN Release 20.x, updated Dec. 20, 2021, Copyright 2021 Cisco and/or its affiliates.

Office Action—Notice of Intention to Grant for European Application No. 22847363.3, dated Aug. 6, 2025, 42 Pages.

Office Action for Indian Application No. 202427045003, dated Apr. 24, 2026, 8 Pages.

* cited by examiner

SYSTEMS AND METHODS FOR ACHIEVING MULTI-TENANCY ON AN EDGE ROUTER

RELATED APPLICATIONS

This application claims priority to U.S. Provisional Patent Application Ser. No. 63/265,463, filed on Dec. 15, 2021, which is hereby incorporated by reference in its entirety.

TECHNICAL FIELD

The present disclosure relates generally to communication networks, and more specifically to systems and methods for achieving multi-tenancy on an edge router in a software-defined wide area network (SD-WAN).

BACKGROUND

Multi-tenancy is a concept that refers to the logical isolation of shared virtual compute, storage, and/or network resources. In a multi-tenancy mode of operation, multiple independent instances (e.g., Layer-3 virtual routing and forwarding instances (VRFs) or Layer-2 virtual local area network instances (VLANs)) of a tenant (e.g., a business entity, a user group, applications, security, etc.) operate in a shared environment while ensuring logical segmentation between the instances. Service providers may use multi-tenancy to achieve effective utilization of network components.

DESCRIPTION OF EXAMPLE EMBODIMENTS

Overview

Figure 1:
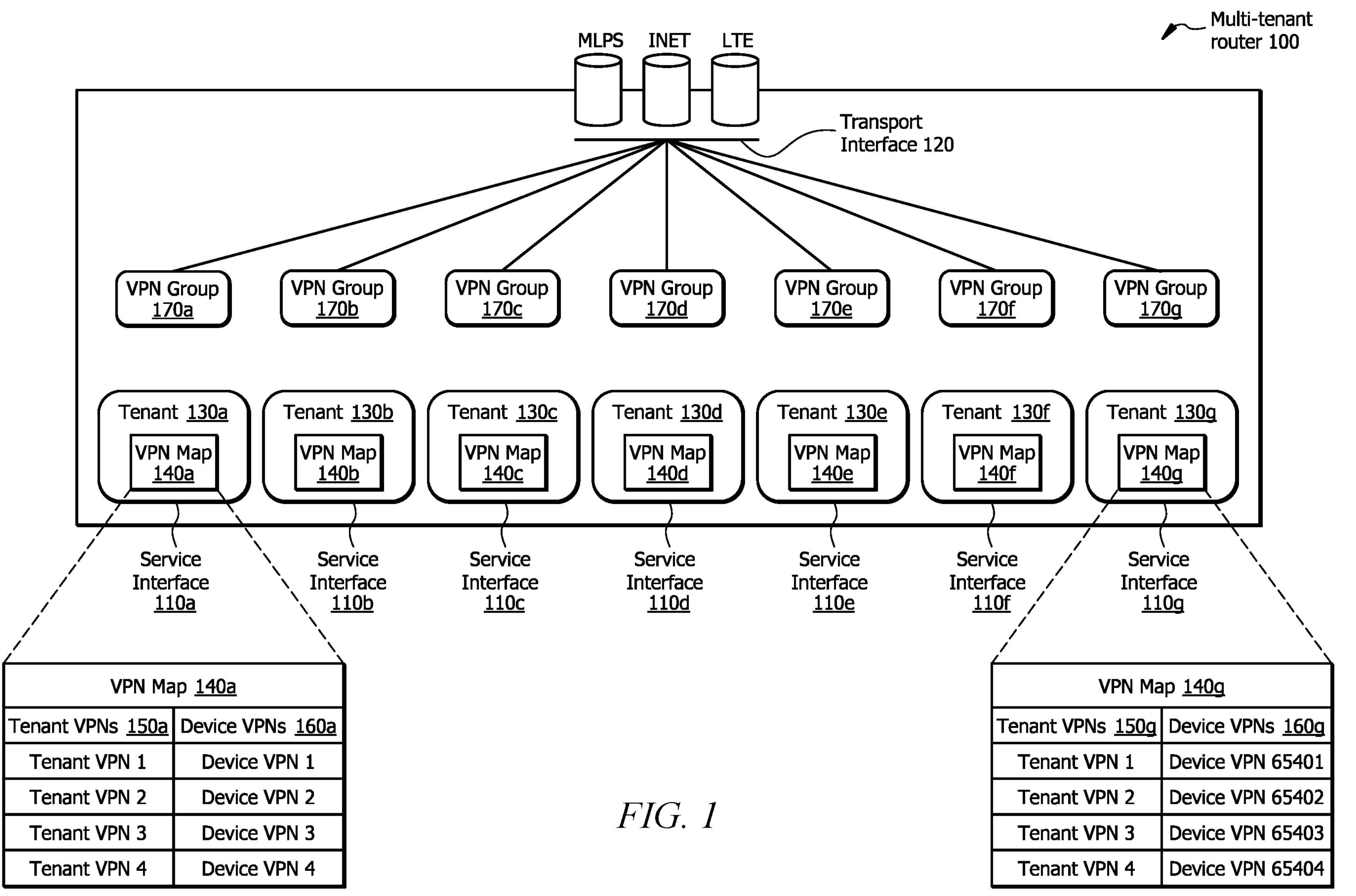
FIG. 1 illustrates an example multi-tenant router in an SD-WAN environment.

According to an embodiment, a router includes one or more processors and one or more computer-readable non-transitory storage media coupled to the one or more processors and including instructions that, when executed by the one or more processors, cause the router to perform operations. The operations include identifying a first tenant. The first tenant is associated with a first tenant VPN. The operations also include determining a mapping of the first tenant VPN to a first device VPN and generating a first label representing the first device VPN. The operations further include adding the first label to a first network packet and communicating the first network packet with the first label to a controller.

In certain embodiments, the first tenant VPN is represented by a number in the range of 1 to 65534. In some embodiments, the first device VPN is represented by a globally unique 16-digit identification number.

In certain embodiments, the operations include receiving a second packet from the controller. The second packet includes a second label representing a second device VPN. The operations may include identifying the first tenant and a second tenant VPN using the second device VPN.

In some embodiments, the operations include identifying a second tenant. The second tenant is associated with a second tenant VPN and an identifier of the second tenant VPN is the same as an identifier of the first tenant VPN. The operations may include determining a mapping of the second tenant VPN to a second device VPN. An identifier of the second device VPN is different than an identifier of the first device VPN.

In certain embodiments, the operations include scheduling traffic based on forwarding classes and bandwidth distribution among interface queues, scheduling the traffic and the bandwidth distribution among VPN groups, and/or shaping the traffic.

In some embodiments, the operations include onboarding the first tenant on the router, determining that the first tenant is assigned to the controller, and establishing a control connection to the controller. In certain embodiments, the router interoperates with other routers associated with the first tenant.

According to another embodiment, a method includes identifying, by a router, a first tenant. The first tenant is associated with a first tenant VPN. The method also includes determining, by the router, a mapping of the first tenant VPN to a first device VPN and generating, by the router, a first label representing the first device VPN. The method further includes adding, by the router, the first label to a first network packet and communicating, by the router, the first network packet with the first label to a controller.

According to yet another embodiment, one or more computer-readable non-transitory storage media embody instructions that, when executed by a processor, cause the processor to perform operations. The operations include identifying a first tenant. The first tenant is associated with a first tenant VPN. The operations also include determining a mapping of the first tenant VPN to a first device VPN and generating a first label representing the first device VPN. The operations further include adding the first label to a first network packet and communicating the first network packet with the first label to a controller.

Technical advantages of certain embodiments of this disclosure may include one or more of the following. In certain embodiments of this disclosure, multi-tenancy is scaled out on SD-WAN edge devices by developing a shared control plane infrastructure across the tenants, which allows the delivery of a cloud scale architecture. In some embodiments of this disclosure, multi-tenancy is achieved without re-inventing the feature code for hierarchical configuration and operational data. Certain embodiments of this disclosure achieve the multi-tenancy in the SD-WAN routers with minimal overhead. The overall output of the system may increase due to sharing key resources within a single instance of router (e.g., the control plane (Internetworking Operating System (IOS)/routing components), the infrastructure, and the data plane by implementing the mapping of application program interfaces (APIs)) rather than creating separate instances.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

This disclosure describes systems and methods for achieving multi-tenancy on an edge router in an SD-WAN environment. The SD-WAN edge infrastructure may be reused among multiple tenants in a service provider's points-of-presence (POPs) and other shared locations to reduce capital expenditures and/or operational costs. The services offered (e.g., controller/policy driven routing, cloud on-ramps, firewalls, Transmission Control Protocol (TCP) performance proxies, etc.) may be segmented by users (e.g., customers or tenants) in such deployments. For example, in an airport where multiple airlines exist that are operating from the same place, service providers may share routers (e.g., multi-tenant edge routers) to lower the costs. For this to occur, the SD-WAN device (e.g., routers based on IOS-XE) should support multi-tenancy. Such routers may include a set of features that assist service providers in deploying a controller driven solution. However, the configuration on such routers is flat without any tenant notion.

A multi-tenant notion may be built into a device's configuration and/or operational data model by building virtual namespaces/boundaries. For example, multi-tenancy may be achieved by creating a per-tenant virtual instance using either virtual machines (VMs) or a container. As another example, multi-tenancy may be achieved by creating a complete virtual namespace for each tenant. However, these approaches typically require restructuring the software stack if the software stack is built into an existing device. This may result in the fragmentation of resources such as central processing unit (CPU), memory, descriptors, and/or scalability. For example, these approaches may result in high usage of compute and memory and/or have a larger footprint due to minimum overhead of each instance. These approaches may also result in additional metadata being sent in the packets to tag the tenant information. Users (e.g., managed service providers) may desire a less complex, single box solution that can be orchestrated from a central/single dashboard, which may provide tenant abstraction within the existing edge platform (e.g., aggregated service routers (ASRs), cloud service routers (CSRs), integrated service routers (ISRs), etc.).

FIG. 1 illustrates an example multi-tenant router 100 in an SD-WAN environment. Multi-tenant router 100 is a connection point within an SD-WAN network that receives, creates, stores, and/or communicates data along a path. In certain embodiments, multi-tenant router 100 is a single device for connecting and/or securing enterprise traffic to the cloud. Multi-tenant router 100 may include one or more hardware devices, software (e.g., a cloud router) that runs as a virtual machine, and the like. In some embodiments, multi-tenant router 100 handles the transmission of data traffic. In the illustrated embodiment of FIG. 1, multi-tenant router 100 includes service interfaces 110, a transport interface 120, tenants 130, VPN maps 140, tenant VPNs 150, device VPNs 160, and VPN groups 170.

Multi-tenant router 100 provides service interfaces 110 and transport interface 120 for communicating with other nodes of the SD-WAN network. Service interfaces 110 are user-facing, service-side interfaces of multi-tenant router 100. In certain embodiments, service interfaces 110 are local area network (LAN) interfaces. Service interfaces 110 may capture the service intent of a customer and request service to a network. Transport interface 120 is a WAN transport interface of multi-tenant router 100. In certain embodiments, transport interface is associated with a VPN (e.g., VPN 0). Transport interface 120 may handle all control plane traffic, which may be carried over OMP sessions, in an overlay network. Transport interface 120 may connect to a WAN transport network (e.g., the Internet, Multiprotocol Label Switching (MPLS), Long Term Evolution (LTE), a metro Ethernet network, etc.).

Multi-tenant router 100 isolates traffic belonging to different tenants 130 by mapping tenant VPNs 150 to device VPNs 160. Tenants 130 (e.g., tenant 130*a*, tenant 130*b*, tenant 130*c*, tenant 130*d*, tenant 130*e*, tenant 130*f*, and tenant 130*g*) are logical containers for application policies. Tenants 130 may allow administrators to exercise domain-based access control. In certain embodiments, tenants 130 are units of isolation from a policy perspective. Tenants 130 may represent customers in a service provider setting, organizations or domains in an enterprise setting, groups of policies, and the like. Tenants 130 may include one or more filters, contracts, outside networks, bridge domains, VRFs, application profiles, etc.

In some embodiments, each tenant (e.g., tenant 130*a*, tenant 130*b*, tenant 130*c*, tenant 130*d*, tenant 130*e*, tenant 130*f*, and tenant 130*g*) is associated with a tenant name (e.g., a tenant organization name). The tenant name may be 128 bits long. In certain embodiments, each tenant 130 (e.g., tenant 130*a*, tenant 130*b*, and tenant 130*c*) is associated with a tenant identifier. Tenant identifiers uniquely identify tenants 130. In some embodiments, a centralized management system generates tenant identifiers. Each tenant identifier may be a global, 16-bit identifier.

VPN maps 140 (e.g., VPN map 140*a* and VPN map 140*b*) of multi-tenant router 100 represent the relationships between tenant VPNs 150 and device VPNs 160. Tenant VPNs 150 identify the VPN connections assigned to each tenant 130. Tenant VPNs 150 may be configured for each tenant 130 using a dashboard of a centralized network management system. In certain embodiments, a particular tenant VPN 150 or a set of tenant VPNs 150 is assigned to a specific tenant 130, with their own configurations and monitoring dashboard environment. Each tenant VPN 150 may be represented by a number within a range of 1 to 65534. In the illustrated embodiment of FIG. 1, tenant 130*a* is associated with tenant VPNs 150*a*, tenant 130*g* is associated with tenant VPNs 150*g*, and so on for tenant 130*b* through tenant 130*f* Tenant VPNs 150*a* associated with tenant 130*a* include a tenant VPN 1, a tenant VPN 2, a tenant VPN 3, and a tenant VPN 4. Tenant VPNs 150*g* associated with tenant 130*g* also include a tenant VPN 1, a tenant VPN 2, a tenant VPN 3, and a tenant VPN 4.

In certain embodiments, multiple tenants 130 may configure the same tenant VPN 150 such that the identifiers for certain tenant VPNs 150 overlap across tenants 130. For example, tenant VPN 1, tenant VPN 2, tenant VPN 3, and tenant VPN 4 associated with tenant 130*a* overlap with tenant VPN 1, tenant VPN 2, tenant VPN 3, and tenant VPN 4 associated with tenant 130*g*. Small and medium enterprises may require tenant VPNs 150 within a particular range (e.g., 1 to 10).

Certain embodiments of this disclosure use device VPN slicing/segmentation per-tenant to achieve multi-tenancy. Device VPNs 160 identify a relationship between a particular tenant 130 and a particular tenant VPN 150. Each device VPN 160 may be represented by a globally unique 16-digit identification number. In certain embodiments, device VPNs 160 are the numbers realized on multi-tenant router 100 by all the features across the stack (due to flat configuration). In some embodiments, device VPNs 160 are realized by configuring VRFs (as numbers) in multi-tenant router 100.

In certain embodiments, each tenant VPN 150 is mapped to one unique device VPN 160 in a global space of 0 to approximately 65,000. This global device VPN space may be common across all tenants 130 and all multi-tenant routers of an SD-WAN network. In certain embodiments, each time tenant 130 creates a new tenant VPN 150, the network management system allocates the next unused device VPN 160 from the global space. In the illustrated embodiment of FIG. 1, tenant 130*a* is associated with device VPNs 160*a*, tenant 130*g* is associated with device VPNs 160*g*, and so on for tenant 130*b* through tenant 130*f*. Device VPNs 160*a* associated with tenant 130*a* include a device VPN 1, a device VPN 2, a device VPN 3, and a device VPN 4. Device VPNs 160*g* associated with tenant 130*g* include a device VPN 65401, a device VPN 65402, a device VPN 65403, and a device VPN 65404.

In certain embodiments, the network management system maps each tenant VPN 150 to device VPN 160. In the illustrated embodiment of FIG. 1, tenant VPNs 150*a* associated with tenant 130*a* are mapped to device VPNs 160*a*. For example, the network management system may assign device VPN 1 to tenant VPN 1 associated with tenant 130*a*, assign device VPN 2 to tenant VPN 2 associated with tenant 130*a*, assign device VPN 3 to tenant VPN 3 associated with tenant 130*a*, and assign device VPN 4 to tenant VPN 4 associated with tenant 130*a*.

In the illustrated embodiment of FIG. 1, tenant VPNs 150*g* associated with tenant 130*g* are mapped to device VPNs 160*g*. For example, the network management system may assign device VPN 65401 to tenant VPN 1 associated with tenant 130*g*, assign device VPN 65402 to tenant VPN 2 associated with tenant 130*g*, assign device VPN 65403 to tenant VPN 3 associated with tenant 130*g*, and assign device VPN 65404 to tenant VPN 4 associated with tenant 130*g*. As such, the identifiers for tenant VPNs 150*a* associated with tenant 130*a* and the identifiers for tenant VPNs 150*g* associated with tenant 130*g* are the same in this embodiment while the identifiers for device VPNs 160*a* associated with tenant 130*a* and the identifiers for device VPNs 160*g* associated with tenant 130*g* are each unique.

In some embodiments, the network management system generates VPN maps 140. In the illustrated embodiment of FIG. 1, VPN map 140*a* associated with tenant 130*a* illustrates a mapping of tenant VPNs 150*a* (tenant VPN 1, tenant VPN 2, tenant VPN 3, and tenant VPN 4) to device VPNs 160*a* (device VPN 1, device VPN 2, device VPN 3, and device VPN 4, respectively). In the illustrated embodiment of FIG. 1, VPN map 140*g* associated with tenant 130*g* illustrates a mapping of tenant VPNs 150*a* (tenant VPN 1, tenant VPN 2, tenant VPN 3, and tenant VPN 4) to device VPNs 160*a* (device VPN 65401, device VPN 65402, device VPN 65403, and device VPN 65404, respectively).

In certain embodiments, VPN maps 140 are maintained in a single pane of the management system of the complete network and propagated by the management system to the routers (e.g., multi-tenant router 100) and/or controllers. The network configuration may be automated to achieve multi-tenancy in the SD-WAN network with minimal overhead on the edge routers. In certain embodiments, per-tenant VPN maps 140 are stored across the system. A data model may be defined for maintaining VPN maps 140 for each tenant 130.

VPN groups 170 are collections of VPNs that are treated similarly. Each VPN group 170 (e.g., VPN group 170*a*, VPN group 170*b*, VPN group 170*c*, VPN group 170*d*, VPN group 170*e*, VPN group 170*f*, and VPN group 170*g*) may be associated with (e.g., assigned) a VPN group name, a VPN group description, available VPN gateways, etc. In certain embodiments, each VPN group 170 is associated with one or more group policies. Group policies may specify attributes that determine user access to and/or use of a particular VPN.

Although FIG. 1 illustrates a particular number of multi-tenant routers 100, service interfaces 110, transport interfaces 120, tenants 130, VPN maps 140, tenant VPNs 150, device VPNs 160, and VPN groups 170, this disclosure contemplates any suitable number of multi-tenant routers 100, service interfaces 110, transport interfaces 120, tenants 130, VPN maps 140, tenant VPNs 150, device VPNs 160, and VPN groups 170. For example, multi-tenant router 100 may include more or less than seven service interfaces 110 and/or seven tenants 130.

Although FIG. 1 illustrates a particular arrangement of service interfaces 110, transport interface 120, tenants 130, VPN maps 140, tenant VPNs 150, device VPNs 160, and VPN groups 170, this disclosure contemplates any suitable arrangement of service interfaces 110, transport interface 120, tenants 130, VPN maps 140, tenant VPNs 150, device VPNs 160, and VPN groups 170. Furthermore, although FIG. 1 describes and illustrates particular components, devices, or systems carrying out particular actions, this disclosure contemplates any suitable combination of any suitable components, devices, or systems carrying out any suitable actions.

Figure 2:
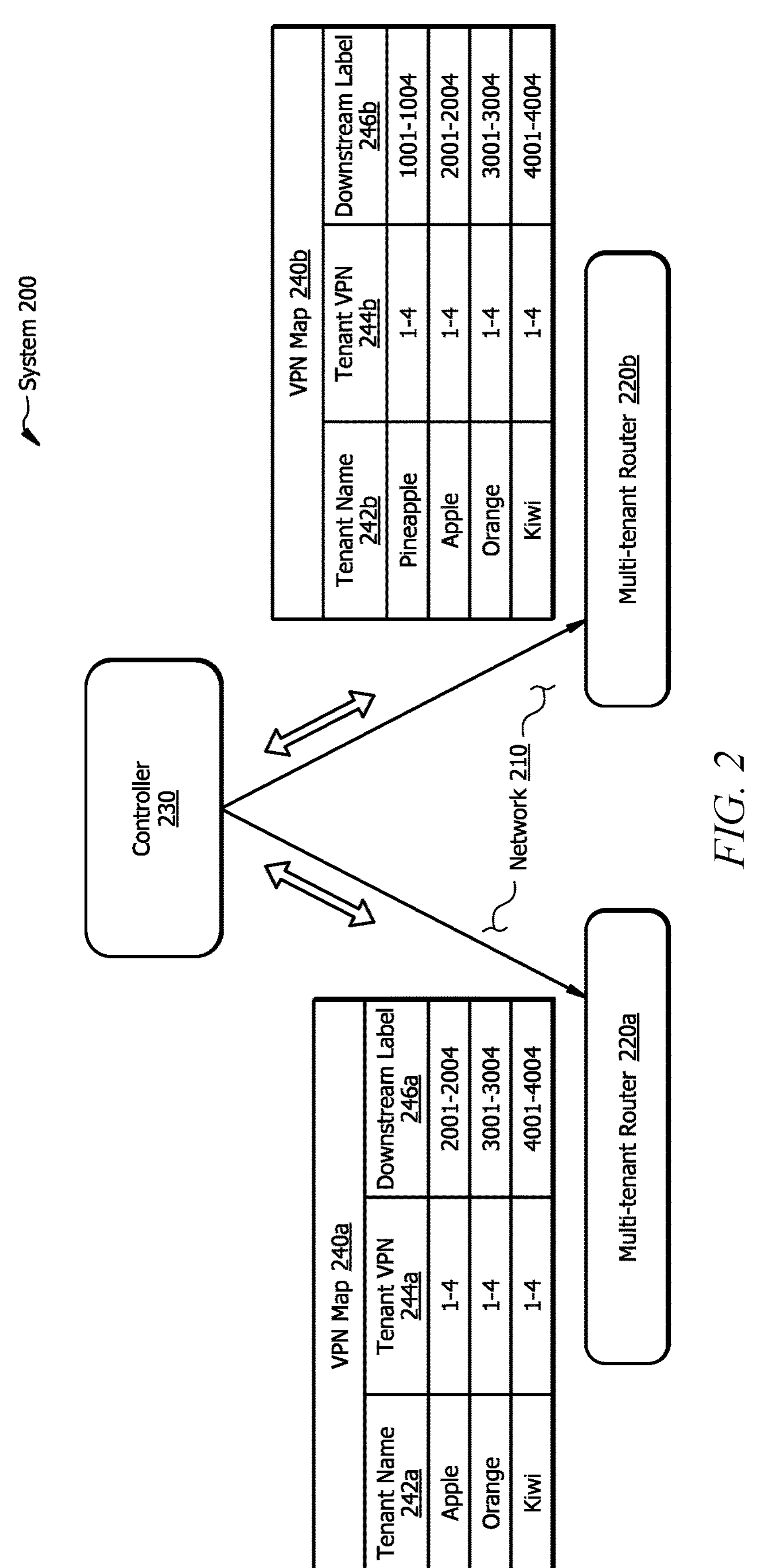
FIG. 2 illustrates an example system for achieving multi-tenancy in an SD-WAN environment.

FIG. 2 illustrates an example system 200 for achieving multi-tenancy in an SD-WAN environment. System 200 or portions thereof may be associated with an entity, which may include any entity, such as a business, company, or enterprise, that uses multi-tenant devices. In certain embodiments, the entity may be a service provider that provides one or more multi-tenant devices. The components of system 200 may include any suitable combination of hardware, firmware, and software. For example, the components of system 200 may use one or more elements of the computer system of FIG. 6. In the illustrated embodiment of FIG. 1, system 200 includes a network 210, multi-tenant routers 220 (e.g., multi-tenant router 220*a* and multi-tenant router 220*b*), and a controller 230.

Network 210 of system 200 is any type of network that facilitates communication between components of system 200. Network 210 may connect one or more components of system 200. One or more portions of network 210 may include an ad-hoc network, the Internet, an intranet, an extranet, a VPN, an (EVPN), a LAN, a wireless LAN (WLAN), a virtual LAN (VLAN), a WAN, a wireless WAN (WWAN), an SD-WAN, a metropolitan area network (MAN), a portion of the Public Switched Telephone Network (PSTN), a cellular telephone network, a Digital Subscriber Line (DSL), an MPLS network, a 3G/4G/5G network, an LTE network, a cloud network, a combination of two or more of these, or other suitable types of networks. Network 210 may include one or more different types of networks. Network 210 may be any communications network, such as a private network, a public network, a connection through the Internet, a mobile network, a WI-FI network, etc. Network 210 may include a core network, an access network of a service provider, an Internet service provider (ISP) network, and the like. One or more components of system 200 may communicate over network 210. In the illustrated embodiment of FIG. 2, network 210 is an SD-WAN.

Multi-tenant routers 220 (e.g., multi-tenant router 220*a* and multi-tenant router 220*b*), of system 200 are connection points within network 210 that receive, create, store, and/or communicate data along a path. In certain embodiments, multi-tenant routers 220 are devices for connecting and/or securing enterprise traffic to the cloud. Multi-tenant routers 220 may include one or more hardware devices, software (e.g., a cloud router) that runs as a virtual machine, and the like. In some embodiments, multi-tenant routers 220 handle the transmission of data traffic. Multi-tenant routers 220 isolate traffic belonging to different tenants by mapping tenant VPNs 244 to device VPNs.

Controller 230 of system 200 monitors, operates, manages, troubleshoots, and/or maintains services related to network 210. Controller 230 may manage provisioning, maintenance, and/or security for network 210. In some embodiments, controller 230 is primarily involved in control plane communication and does not handle data traffic. However, controller 230 may control the flow of data traffic throughout network 210. In certain embodiments, controller 230 works with a network management system to authenticate multi-tenant routers 220 as they join network 210 and to orchestrate connectivity among multi-tenant routers 220.

VPN maps 240 (e.g., VPN map 240*a* and VPN map 240*b*) of system 200 illustrate the mappings of tenant names 242 (e.g., tenant names 242*a* and tenant names 242*b*), tenant VPNs 244 (e.g., tenant VPNs 244*a* and tenant VPNs 244*b*), and labels 246 (e.g., downstream labels 246*a* and downstream labels 246*b*). Tenant names 242 are representations used to identify tenants. In certain embodiments, tenant names 242 are up to 128 characters and include alphanumeric characters. Tenant VPNs 244 identify the VPN connections assigned to each tenant. Labels 246 represent the device VPNs described above in FIG. 1. In certain embodiments, multi-tenant routers 220 (e.g., multi-tenant router 220*a* and multi-tenant router 220*b*) isolate traffic belonging to different tenants by mapping tenant VPNs 244 to device VPNs.

In the illustrated embodiment of FIG. 1, VPN map 240*a* is associated with multi-tenant router 220*a*, and VPN map 240*b* is associated with multi-tenant router 220*b*. VPN map 240*a* includes tenant names 242*a* (Apple, Orange, and Kiwi), tenant VPNs 244*a* (three sets of tenant VPNs 1 through 4), and downstream labels 246*a* (labels 2001 through 2004, labels 3001 through 3004, and labels 4001 through 4004). Tenant Apple is assigned tenant VPNs 1 through 4, and Apple's tenant VPNs 1 through 4 are mapped to downstream labels 2001 through 2004, respectively. Tenant Orange is assigned tenant VPNs 1 through 4, and Orange's tenant VPNs 1 through 4 are mapped to downstream labels 3001 through 3004, respectively. Tenant Kiwi is assigned tenant VPNs 1 through 4, and tenant Kiwi's VPNs 1 through 4 are mapped to downstream labels 4001 through 4004, respectively.

VPN map 240*b* includes tenant names 242*b* (Pineapple, Apple, Orange, and Kiwi), tenant VPNs 244*b* (four sets of tenant VPNs 1 through 4), and downstream labels 246*b* (labels 1001 through 1004, labels 2001 through 2004, labels 3001 through 3004, and labels 4001 through 4004). Tenant Pineapple is assigned tenant VPNs 1 through 4, and Pineapple's tenant VPNs 1 through 4 are mapped to downstream labels 1001 through 1004, respectively. Tenant Apple is assigned tenant VPNs 1 through 4, and Apple's tenant VPNs 1 through 4 are mapped to downstream labels 2001 through 2004, respectively. Tenant Orange is assigned tenant VPNs 1 through 4, and Orange's tenant VPNs 1 through 4 are mapped to downstream labels 3001 through 3004, respectively. Tenant Kiwi is assigned tenant VPNs 1 through 4, and tenant Kiwi's VPNs 1 through 4 are mapped to downstream labels 4001 through 4004, respectively. In certain embodiments, multi-tenant routers 220 implement an API to acquire VPN maps 240.

In the illustrated embodiment of FIG. 2, tenants Apple, Orange, and Kiwi have been onboarded to multi-tenant router 220*a* and multi-tenant router 220*b*. Tenant Pineapple has only been onboarded to multi-tenant router 220*b*. In certain embodiments, a network management system performs the mapping between tenant VPNs 244 and device VPNs (represented as labels 246 in FIG. 2) when a tenant is onboarded to multi-tenant router 220*a* or multi-tenant router 220*b*. When a tenant is onboarded to multi-tenant router 220*a* or multi-tenant router 220*b*, multi-tenant router 220*a* or multi-tenant router 220*b* may establish control connections to controllers assigned to the tenant. In the illustrated embodiment of FIG. 2, multi-tenant router 220*a* and multi-tenant router 220*b* establish control connections to controller 230.

Overlay Management Protocol (OMP) is a control protocol that may be used to exchange routing, policy, and/or management information between controller 230 and multi-tenant routers 220 of network 210. In certain embodiments, multi-tenant routers 220 automatically initiate OMP peering sessions between themselves. OMP advertises to its peers the routes and services that it has learned from its local site. In certain embodiments, controller 230 learns the topology of network 210 through OMP routes.

In certain embodiments, a route exchange is performed within network 210 using the tenant's notion of tenant VPN 244. As part of the overlay setup, labels 246 associated with tenant VPNs 244 may be exchanged though controller 230. In some embodiments, while sending a packet, each multi-tenant router 220 uses labels 246 understood from the other side to represent tenant VPNs 244. For example, multi-tenant router 220*a* may use label 4001 included in the incoming packet to understand tenant Kiwi's VPN 1. Multi-tenant router 220*a* may use the mapping APIs to understand labels 246*b* (the device VPNs) and forward the traffic accordingly.

In certain embodiments, multi-tenant routers 220 insert labels 246 into packets exchanged between components of network 210. For example, multi-tenant router 220*b* may insert label 2001 into a packet associated with Apple's tenant VPN 1 and communicate label 2001 to controller 230. Controller 230 then communicates the packet to multi-tenant router 220*b*. Upon receiving the packet, multi-tenant router 220*b* identifies Apple's tenant VPN 1 using label 2001 (which represents a device VPN). As another example, multi-tenant router 220*b* may insert label 3001 into a packet associated with Orange's tenant VPN 1 and communicate label 3001 to controller 230. Controller 230 then communicates the packet to multi-tenant router 220*a*. Upon receiving the packet, multi-tenant router 220*a* identifies Orange's tenant VPN 1 using label 3001 (which represents a device VPN). Through the mapping of tenant VPNs 244 to device VPNs, multi-tenant routers 220 are able to isolate traffic belonging to different tenants.

Although FIG. 2 illustrates a particular number of networks 210, multi-tenant routers 220, controllers 230, VPN maps 240, tenant names 242, tenant VPNs 244, and labels 246, this disclosure contemplates any suitable number of networks 210, multi-tenant routers 220, controllers 230, VPN maps 240, tenant names 242, tenant VPNs 244, and labels 246. Although FIG. 2 illustrates a particular arrangement of network 210, multi-tenant routers 220, controllers 230, VPN maps 240, tenant names 242, tenant VPNs 244, and labels 246, this disclosure contemplates any suitable arrangement of network 210, multi-tenant routers 220, controllers 230, and VPN maps 240, tenant names 242, tenant VPNs 244, and labels 246. Furthermore, although FIG. 2 describes and illustrates particular components, devices, or systems carrying out particular actions, this disclosure contemplates any suitable combination of any suitable components, devices, or systems carrying out any suitable actions.

Figure 3:
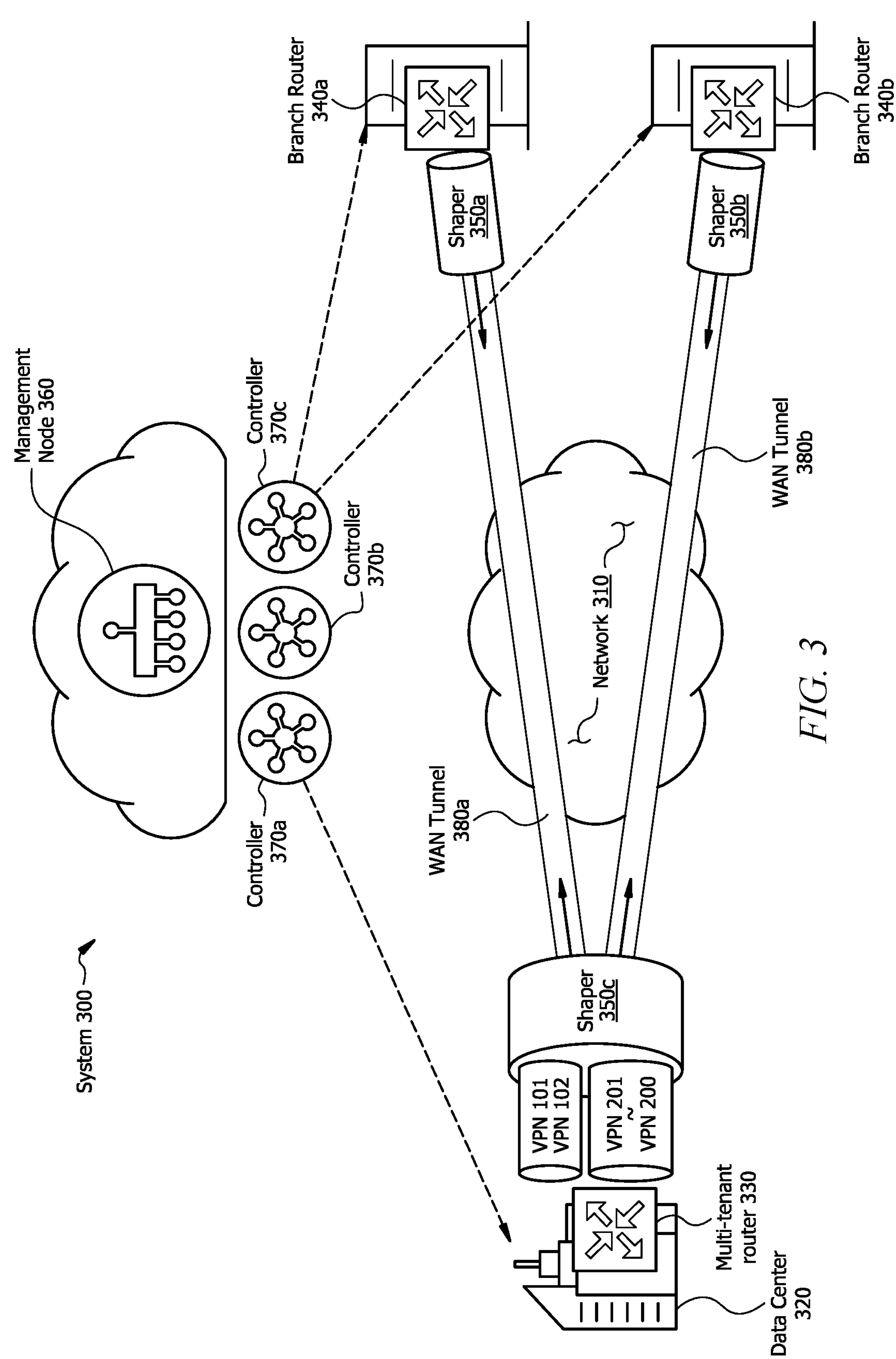
FIG. 3 illustrates an example system for scheduling per-tenant virtual private network (VPN) groups.

FIG. 3 illustrates an example system 300 for scheduling per-tenant VPN groups. System 300 or portions thereof may be associated with an entity, which may include any entity, such as a business, company, or enterprise, that uses multi-tenant devices. In certain embodiments, the entity may be a service provider that provides one or more multi-tenant devices. The components of system 300 may include any suitable combination of hardware, firmware, and software. For example, the components of system 300 may use one or more elements of the computer system of FIG. 6. In the illustrated embodiment of FIG. 3, system 300 includes a network 310, a data center 320, a multi-tenant router 330, branch routers 340, shapers 350, a management node 360, controllers 370, and WAN tunnels 380.

Network 310 of system 300 is any type of network that facilitates communication between components of system 300. Network 310 may connect one or more components of system 300. One or more portions of network 310 may include an ad-hoc network, the Internet, an intranet, an extranet, a VPN, an EVPN, a LAN, a WLAN, a VLAN, a WAN, a WWAN, an SD-WAN, a MAN, a portion of the PSTN, a cellular telephone network, a DSL, an MPLS network, a 3G/4G/5G network, an LTE network, a cloud network, a combination of two or more of these, or other suitable types of networks. Network 310 may include one or more different types of networks. Network 310 may be any communications network, such as a private network, a public network, a connection through the Internet, a mobile network, a WI-FI network, etc. Network 310 may include a core network, an access network of a service provider, an ISP network, and the like. One or more components of system 300 may communicate over network 310. In the illustrated embodiment of FIG. 3, network 310 is an SD-WAN.

Data center 320 of system 300 is a physical facility that organizations use to house their critical applications and data. Data center 320 may include routers, switches, firewalls, storage systems, servers, application-delivery controllers, and the like. These components of data center 320 may store and/or manage business-critical data, applications, and the like. Data center 320 may be an enterprise data center, a managed services data center, a colocation data center, a cloud data center, a combination thereof, or any other suitable type of data center. In the illustrated embodiment of FIG. 3, data center 320 includes multi-tenant router 330.

Multi-tenant router 330 of system 300 is a connection point within network 310 that receives, creates, stores, and/or communicates data along a path. In certain embodiments, multi-tenant router 330 is a device for connecting and/or securing enterprise traffic to the cloud. Multi-tenant router 330 may include one or more hardware devices, software (e.g., a cloud router) that runs as a virtual machine, and the like. In some embodiments, multi-tenant router 330 handles the transmission of data traffic. Multi-tenant router 330 isolates traffic belonging to different tenants by mapping tenant VPNs to device VPNs. In the illustrated embodiment of FIG. 3, multi-tenant router 330 is owned by a service provider.

Branch routers 340 (e.g., branch router 340*a* and branch router 340*b*) of system 300 are network nodes that use static and/or dynamic routing to send data to and/or receive data from one or more nodes of system 300. Branch routers 340 may include one or more hardware devices, one or more servers that include routing software, and the like. Branch routers 340 may be located in branch offices. Branch offices may provide users at geographically disperse remote sites access to the same network services as users in the enterprise's campus. Each branch location may include one or more buildings, offices, stores, homes, and the like. In the illustrated embodiment of FIG. 3, branch router 340*a* is associated with (e.g., owned by) a first tenant, and branch router 340*b* is associated with (e.g., owned by) a second tenant.

Shapers 350 (shaper 350*a*, shaper 350*b*, and shaper 350*c*) of system 300 are network management tools used to control bandwidth in network 310. In certain embodiments, shapers 350 shape the WAN interface bandwidth. Shapers 350 may comply with a specified traffic profile. In certain embodiments, shapers 350 maximize or guarantee performance and/or boost latency. Shapers 350 may increase available bandwidth for certain kinds of packets. In the illustrated embodiment of FIG. 3, branch router 340*a* includes shaper 350*a*, branch router 340*b* includes shaper 350*b*, and multi-tenant router 330 includes shaper 350*c*.

Management node 360 of system 300 is a centralized network management system that allows a user to configure and/or manage network 310 from a graphical dashboard. The dashboard of management node 360 may provide a visual window into network 310 that allows a user to configure and/or manage the edge nodes (e.g., multi-tenant router 330). In certain embodiments, management node 360 performs the mapping between the tenant and device VPNs when a tenant is onboarded on multi-tenant router 330. For example, management node 360 may map a tenant VPN to a device VPN while the tenant VPN is created. In certain embodiments, management node 360 is software that runs on one or more servers of network 310. This server may be situated in a centralized location (e.g., data center 320). In certain embodiments, the software of management node 360 may run on the same physical server as the software of one or more controllers 370.

Controllers 370 (e.g., controller 370*a*, controller 370*b*, and controller 370*c*) of system 300 monitor, operate, manage, troubleshoot, and/or maintain services related to network 310. Controllers 370 may manage provisioning, maintenance, and/or security for network 310. In some embodiments, controllers 370 are primarily involved in control plane communication and do not handle data traffic. However, controllers 370 may control the flow of data traffic throughout network 310. In certain embodiments, each controller 370 (e.g., controller 370*a*, controller 370*b*, and controller 370*c*) is assigned a controller identifier. The controller identifier is any representation that uniquely identifies controller 370 (e.g., a Unique Device Identifier (UDI)).

WAN tunnels 380 (e.g., WAN tunnel 380*a* and WAN tunnel 380*b*) of system 300 are transports that communicate traffic between nodes of network 310. In certain embodiments, WAN tunnels 380 are WAN IPSec/Generic Routing Encapsulation (GRE) tunnels. In the illustrated embodiment of FIG. 3, WAN tunnel 380*a* communicates traffic between multi-tenant router 330 and branch router 340*a*, and WAN tunnel 380*b* communicates traffic between multi-tenant router 330 and branch router 340*b*. WAN tunnels 380 from the WAN interfaces of multi-tenant router 330 have limited bandwidth. To achieve a desired Quality of Service (QoS) for traffic belonging to different applications, system 300 may control how this limited bandwidth is used. When the traffic from the branch network belongs to different VPNs, the bandwidth that can be used by traffic belonging to different VPNs may be restricted. In certain embodiments, the traffic belonging to each VPN may be categorized into various priority classes through one or more QoS policies.

In the illustrated embodiment of FIG. 3, multi-tenant router 330, branch router 340*a*, and branch router 340*b* implement a 3 level QoS scheme for per-tenant QoS. Per-VPN QoS may be applied to the VPNs. For example, VPN 101 and VPN 102 traffic may be scheduled together and shaped using shaper 350*c*. As another example, VPN 201 through VPN 209 traffic may be scheduled together and shaped using shaper 350*c*. In certain embodiments, branch routers 340 shape traffic before communicating traffic to multi-tenant router 330. In some embodiments, per-VPN QoS provides support for full mesh topology.

Although FIG. 3 illustrates a particular number of networks 310, data centers 320, multi-tenant routers 330, branch routers 340, shapers 350, management nodes 360, and controllers 370, this disclosure contemplates any suitable number of networks 310, data centers 320, multi-tenant routers 330, branch routers 340, shapers 350, management nodes 360, and controllers 370. Although FIG. 3 illustrates a particular arrangement of network 310, data center 320, multi-tenant router 330, branch routers 340, shapers 350, management node 360, and controllers 370, this disclosure contemplates any suitable arrangement of network 310, data center 320, multi-tenant router 330, branch routers 340, shapers 350, management node 360, and controllers 370. Furthermore, although FIG. 3 describes and illustrates particular components, devices, or systems carrying out particular actions, this disclosure contemplates any suitable combination of any suitable components, devices, or systems carrying out any suitable actions.

Figure 4:
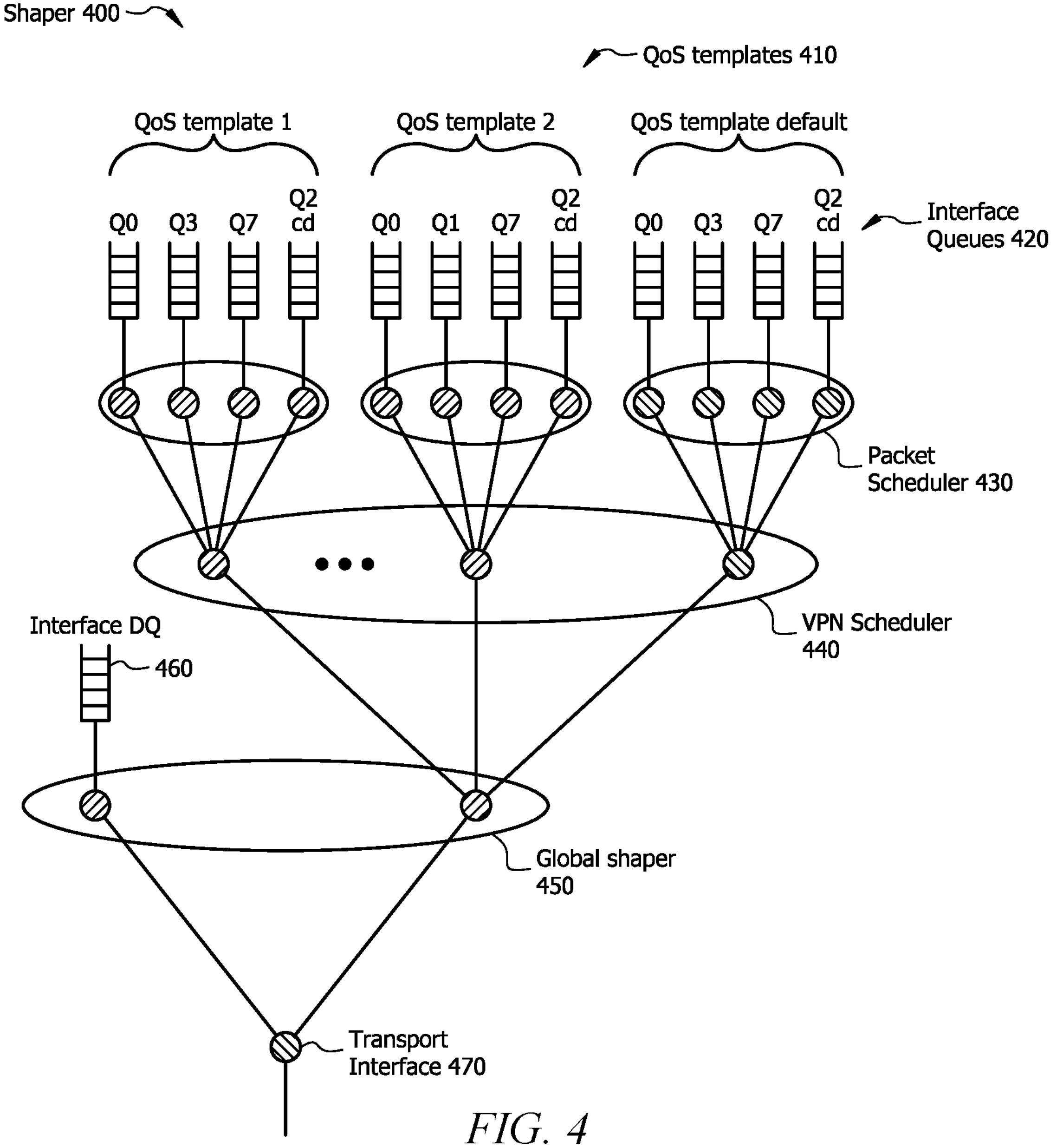
FIG. 4 illustrates an example shaper that may be used by the embodiments of FIGS. 1 through 3 above.

FIG. 4 illustrates a shaper 400 that may be used by the embodiments of FIGS. 1 through 3 above. Shaper 400 is a network management tool used to control bandwidth. In certain embodiments, shaper 400 shapes the WAN interface bandwidth. Shaper 400 may comply with a specified traffic profile. In certain embodiments, shaper 400 maximizes or guarantees performance and/or boost latency. Shaper 400 may increase available bandwidth for certain kinds of packets. Shaper 400 of FIG. 4 includes QoS templates 410, interface queues 420, a packets scheduler 430, a VPN scheduler 440, a global shaper 450, an interface DQ 460, and a transport interface 470.

QoS templates 410 (e.g., QoS template 1, QoS template 2, and QoS template default) are used to configure adaptive QoS for particular types of interfaces (e.g., Ethernet, cellular, or DSL interfaces). In certain embodiments, a QoS policy engine applies QoS policies to traffic. The QoS policy engine may apply one or more QoS policies to achieve a specific QoS for each VPN or each group of VPNs. One or more QoS policies may create forwarding classes and associate the forwarding classes with specific interface queues 420 (e.g., queue 0 to queue 7). In certain embodiments, to differentiate traffic from different applications, traffic from each application or application group is assigned to a specific forwarding class.

In certain embodiments, one or more QoS policies may define a VPN list consisting of a VPN or two or more VPNs that must be treated alike. In certain embodiments, one or more QoS policies may use QoS maps to define parameters such as bandwidth and buffer percentage, and/or the scheduling and packet-drop schemes for each interface queue 420. In certain embodiments, one or more policies may use VPN QoS maps to associate QoS maps with VPN lists and define the minimum and maximum bandwidth that must be used by traffic belonging to the VPNs in a particular VPN list. The device VPNs corresponding to the tenant VPNs may be specified in the VPN lists that are configured per-VPN QoS policy.

In some embodiments, a three-level hierarchical QoS model is applied to traffic using one or more QoS policies. The hierarchical QoS model may include a packet scheduler 430, a VPN scheduler 440, and a global shaper 450. Packet scheduler 430 schedules packets based on forwarding classes and bandwidth distribution among interface queues 420. VPN scheduler 440 schedules packets and distributes bandwidth among VPNs or VPN groups. For example, VPN scheduler 440 may assign packets received from QoS template 1 to VPNs 11 and 12 and assign these packets 50 percent of the total bandwidth. VPN scheduler 440 may assign packets received from QoS template 2 to VPN 100 and assign these packets 20 percent of the total bandwidth. And VPN scheduler 440 may assign packets received from QoS 30 percent of the total bandwidth. Once VPN scheduler 440 schedules the packets, global shaper 450 shapes the WAN interface bandwidth accordingly.

Interface DQ 460 is a distributed queue interface. Traffic from interface DQ 460 is communicated to transport interface 470. Transport interface 470 of FIG. 4 is a tunnel interface. In certain embodiments, transport interface 470 may be located at an endpoint of WAN tunnel 380*a* and/or WAN tunnel 380*b* of FIG. 3. In some embodiments, transport interface 470 is a Gigabit Ethernet interface. In certain embodiments, a schedule is created for transport interface 470 in accordance with the actions of packet scheduler 430, VPN scheduler 440, and/or global shaper 450. Transport interface 470 communicates the packets to one or more other network nodes in accordance with the schedule.

Although FIG. 4 illustrates a particular number of shapers 400, QoS templates 410, interface queues 420, packets schedulers 430, a VPN schedulers 440, a global shapers 450, interface DQs 460, and transport interfaces 470, this disclosure contemplates any suitable number of shapers 400, QoS templates 410, interface queues 420, packets schedulers 430, a VPN schedulers 440, a global shapers 450, interface DQs 460, and transport interfaces 470. Although FIG. 4 illustrates a particular arrangement of shaper 400, QoS templates 410, interface queues 420, packets scheduler 430, a VPN scheduler 440, a global shaper 450, interface DQ 460, and transport interface 470, this disclosure contemplates any suitable arrangement of shaper 400, QoS templates 410, interface queues 420, packets scheduler 430, a VPN scheduler 440, a global shaper 450, interface DQ 460, and transport interface 470. Furthermore, although FIG. 4 describes and illustrates particular components, devices, or systems carrying out particular actions, this disclosure contemplates any suitable combination of any suitable components, devices, or systems carrying out any suitable actions.

Figure 5:
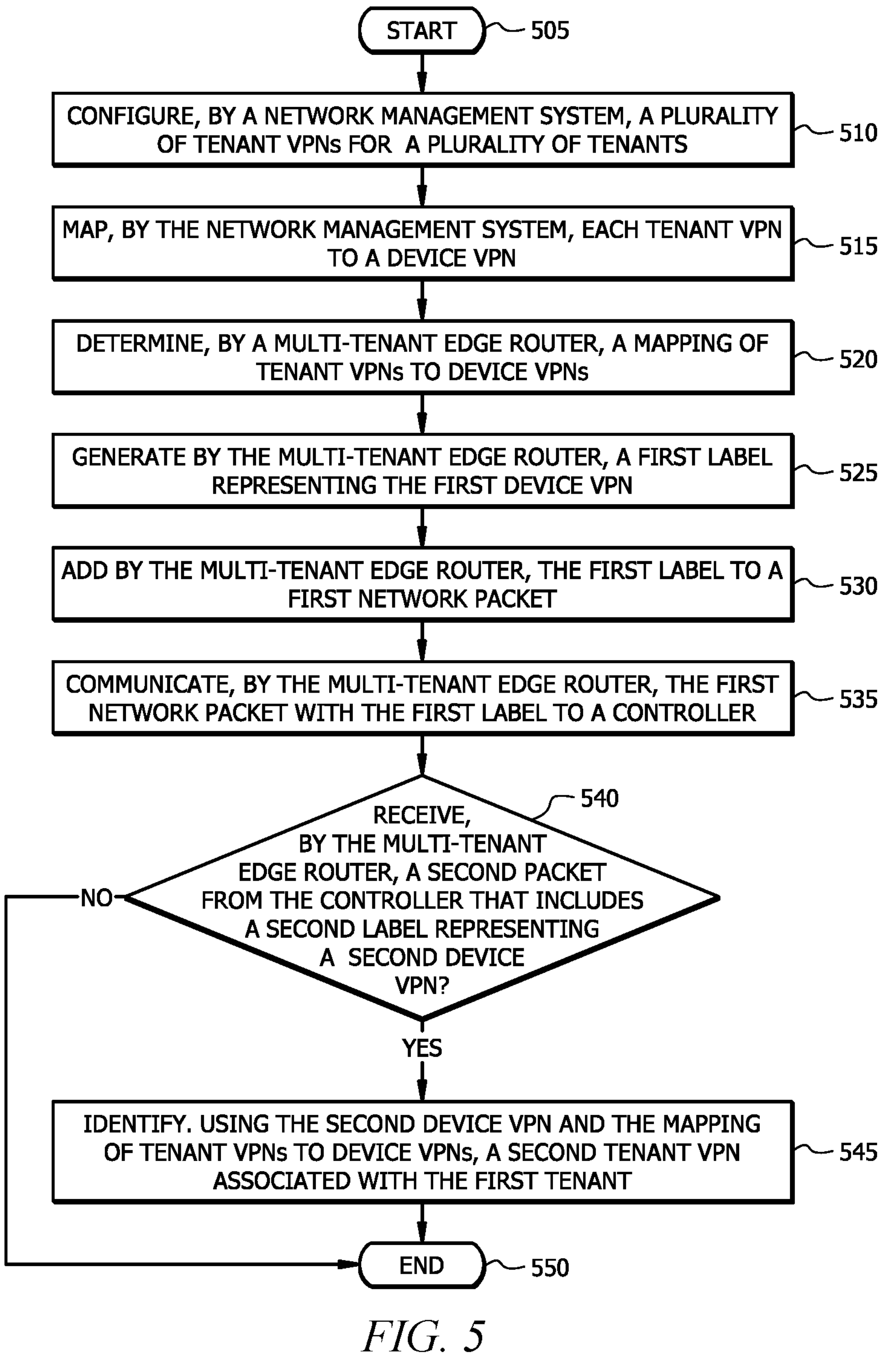
FIG. 5 illustrates an example method for achieving multi-tenancy in an SD-WAN environment.

FIG. 5 illustrates an example method 500 for achieving multi-tenancy in an SD-WAN environment. Method 500 begins at step 505. At step 510 of method 500, a network management system configures a plurality of tenant VPNs for a plurality of tenants. For example, management node 360 of FIG. 3 may configure a plurality of tenant VPNs 150 (e.g., tenant VPN 150*a* through tenant VPN 150*g*) of FIG. 1 for a plurality of tenants 130 (e.g., tenant 130*a* through tenant 130*g*) of FIG. 1. In certain embodiments, the network management system configures the tenant VPNs in response to the associated tenants being onboarded to a multi-tenant edge router. Method 500 then moves from step 510 to step 515, where the network management system maps each tenant VPN to a device VPN. For example, management node 360 of FIG. 3 may map each tenant VPN 150 of FIG. 1 to device VPN 160 of FIG. 1. In certain embodiments, each tenant VPN is represented by a number within a range of 1 to 65534. In some embodiments, each device VPN is represented by a globally unique 16-digit identification number. Method 500 then moves from step 515 to step 520.

At step 520 of method 500, the multi-tenant edge router determines a mapping of tenant VPNs to device VPNs. For example, referring to FIG. 1, multi-tenant router 100 determines a mapping of tenant VPNs 150 to device VPNs 160 for each tenant 130 onboarded to multi-tenant router 100. Method 500 then moves from step 520 to step 525, where the multi-tenant router generates a first label representing a first device VPN. For example, referring to FIG. 2, multi-tenant router 220*a* generates first label 2001 for Apple's tenant VPN 1. Method 500 then moves from step 525 to step 530, where the multi-tenant edge router adds the first label to a first network packet. For example, referring to FIG. 2, multi-tenant router 220*a* adds label 2001 associated with Apple's tenant VPN 1 to Apple's network packet that has been scheduled to be delivered via Apple's tenant VPN 1. Method 500 then moves from step 530, to step 535, where the multi-tenant edge router communicates the first network packet with the first label to a controller. For example, referring to FIG. 2, multi-tenant router 220*a* may communicate the network packet with label 2001 to controller 230.

At step 540 of method 500, the multi-tenant edge router determines whether it has received a second network packet from the controller that includes a second label representing a second device VPN. For example, referring to FIG. 2, multi-tenant router 220*a* may determine whether it has received aa second network packet from controller 230 that includes label 246*b*. If the multi-tenant edge router does not receive a second network packet from the controller that includes a second label representing a second device VPN, method 500 advances to step 550, where method 500 ends.

If, at step 540, the multi-tenant edge router determines that it has received a second network packet from the controller that includes a second label representing a second device VPN, method 500 moves to step 545. At step 545 of method 500, the multi-tenant router identifies, using the second device VPN and the mapping of the tenant VPNs to device VPNs, a tenant VPN associated with a tenant. For example, referring to FIG. 2, multi-tenant router 220*a* may identify Apple's tenant VPN 2 by mapping label 2002 (the device VPN) to tenant VPN 2. Method 500 then moves from step 545 to step 550, where method 500 ends.

Although this disclosure describes and illustrates particular steps of method 500 of FIG. 5 as occurring in a particular order, this disclosure contemplates any suitable steps of method 500 of FIG. 5 occurring in any suitable order. Although this disclosure describes and illustrates an example method for achieving multi-tenancy in an SD-WAN environment including the particular steps of the method of FIG. 5, this disclosure contemplates any suitable method for achieving multi-tenancy in an SD-WAN environment, which may include all, some, or none of the steps of the method of FIG. 5, where appropriate. Although FIG. 5 describes and illustrates particular components, devices, or systems carrying out particular actions, this disclosure contemplates any suitable combination of any suitable components, devices, or systems carrying out any suitable actions.

Figure 6:
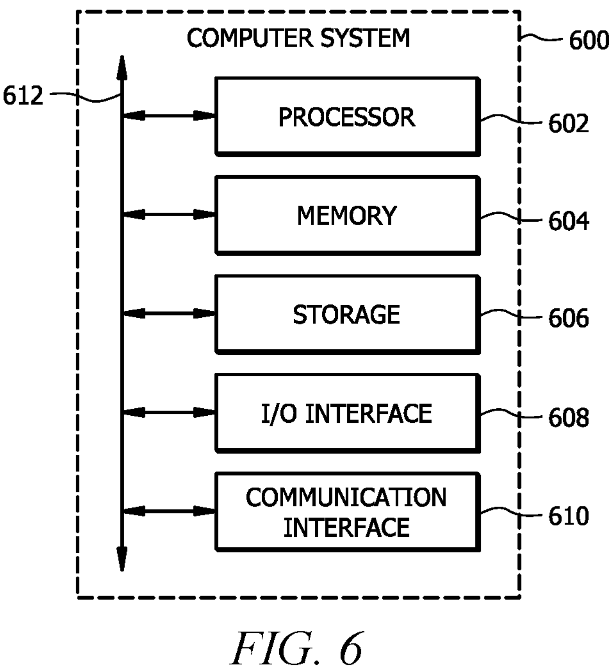
FIG. 6 illustrates an example computer system that may be used by the systems and methods described herein.

FIG. 6 illustrates an example computer system 600. In particular embodiments, one or more computer system 600 perform one or more steps of one or more methods described or illustrated herein. In particular embodiments, one or more computer system 600 provide functionality described or illustrated herein. In particular embodiments, software running on one or more computer system 600 performs one or more steps of one or more methods described or illustrated herein or provides functionality described or illustrated herein. Particular embodiments include one or more portions of one or more computer system 600. Herein, reference to a computer system may encompass a computing device, and vice versa, where appropriate. Moreover, reference to a computer system may encompass one or more computer systems, where appropriate.

This disclosure contemplates any suitable number of computer system 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer system 600; be unitary or distributed; span multiple locations; span multiple machines; span multiple data centers; or reside in a cloud, which may include one or more cloud components in one or more networks. Where appropriate, one or more computer system 600 may perform without substantial spatial or temporal limitation one or more steps of one or more methods described or illustrated herein. As an example and not by way of limitation, one or more computer system 600 may perform in real time or in batch mode one or more steps of one or more methods described or illustrated herein. One or more computer system 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or universal serial bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer system 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a 3G network, a 4G network, a 5G network, an LTE network, or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local bus (VLB), or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A router comprising one or more processors and one or more computer-readable non-transitory storage media coupled to the one or more processors and including instructions that, when executed by the one or more processors, cause the router to perform operations comprising:

onboarding a plurality of tenants, wherein a first tenant of the plurality of tenants is associated with a first tenant virtual private network (VPN);

determining that the first tenant is assigned to a controller, wherein the controller orchestrates connectivity among a plurality of multi-tenant routers;

establishing a control connection to the controller;

acquiring, from a management node associated with the controller, a first mapping of the first tenant VPN to a first device VPN, wherein the first device VPN is allocated from a global device VPN space that is common across the plurality of tenants;

generating a first label representing a second mapping of a tenant name to the first tenant VPN;

adding the first label to a first network packet; and communicating the first network packet with the first label to the controller;

wherein a same identifier for the first tenant VPN is used by the first tenant and at least one other tenant of the plurality of tenants.

2. The router of claim 1, the operations further comprising:

receiving a second packet from the controller, wherein the second packet comprises a second label representing a third mapping of the tenant name to a second tenant VPN; and identifying a second device VPN using the third mapping of the tenant name to the second tenant VPN.

3. The router of claim 1, the operations further comprising:

identifying a second tenant of the plurality of tenants, wherein:

the second tenant is associated with a second tenant VPN; and an identifier of the second tenant VPN is the same as an identifier of the first tenant VPN; and determining a mapping of the second tenant VPN to a second device VPN, wherein an identifier of the second device VPN is different than an identifier of the first device VPN.

4. The router of claim 1, wherein:

the first tenant VPN is represented by a number within a range of 1 to 65534; and the first device VPN is represented by a globally unique 16-digit identification number.

5. The router of claim 1, the operations further comprising:

scheduling traffic based on forwarding classes and bandwidth distribution among interface queues;

scheduling the traffic and the bandwidth distribution among VPN groups; and shaping the traffic.

6. The router of claim 1, wherein the router interoperates with other routers associated with the first tenant.

7. The router of claim 1, wherein:

the global device VPN space is common across all multi-tenant routers of a software-defined wide area network (SD-WAN) network; and each time a new tenant VPN is created, the new tenant VPN is allocated a next unused device VPN from the global device VPN space.

8. A method, comprising:

identifying, by a router, a plurality of tenants, wherein a first tenant of the plurality of tenants is associated with a first tenant virtual private network (VPN);

determining, by the router, a first mapping of the first tenant VPN to a first device VPN, wherein the first device VPN is allocated from a global device VPN space that is common across the plurality of tenants;

generating, by the router, a first label representing a second mapping of a tenant name to the first tenant VPN;

adding, by the router, the first label to a first network packet; and communicating, by the router, the first network packet with the first label to a controller;

wherein a same identifier for the first tenant VPN is used by the first tenant and at least one other tenant of the plurality of tenants.

9. The method of claim 8, further comprising:

receiving, by the router, a second packet from the controller, wherein the second packet comprises a second label representing a third mapping of the tenant name to a second tenant VPN; and identifying, by the router, a second device VPN using the third mapping of the tenant name to the second tenant VPN.

10. The method of claim 8, further comprising:

identifying, by the router, a second tenant of the plurality of tenants, wherein:

the second tenant is associated with a second tenant VPN; and an identifier of the second tenant VPN is the same as an identifier of the first tenant VPN; and determining, by the router, a mapping of the second tenant VPN to a second device VPN, wherein an identifier of the second device VPN is different than an identifier of the first device VPN.

11. The method of claim 8, further comprising:

scheduling, by the router, traffic based on forwarding classes and bandwidth distribution among interface queues;

scheduling, by the router, the traffic and the bandwidth distribution among VPN groups; and shaping, by the router, the traffic.

12. The method of claim 8, further comprising:

onboarding the first tenant on the router;

determining that the first tenant is assigned to the controller; and establishing a control connection to the controller.

13. The method of claim 8, wherein the router interoperates with other routers associated with the first tenant.

14. The method of claim 8, wherein:

the global device VPN space is common across all multi-tenant routers of a software-defined wide area network (SD-WAN) network; and each time a new tenant VPN is created, the new tenant VPN is allocated a next unused device VPN from the global device VPN space.

15. One or more computer-readable non-transitory storage media embodying instructions that, when executed by a processor, cause the processor to perform operations comprising:

identifying a plurality of tenants, wherein a first tenant of the plurality of tenants is associated with a first tenant virtual private network (VPN);

determining a first mapping of the first tenant VPN to a first device VPN, wherein the first device VPN is allocated from a global device VPN space that is common across the plurality of tenants;

generating a first label representing a second mapping of a tenant name to the first tenant VPN;

adding the first label to a first network packet; and communicating the first network packet with the first label to a controller;

wherein a same identifier for the first tenant VPN is used by the first tenant and at least one other tenant of the plurality of tenants.

16. The one or more computer-readable non-transitory storage media of claim 15, the operations further comprising:

receiving a second packet from the controller, wherein the second packet comprises a second label representing a third mapping of the tenant name to a second tenant VPN; and identifying a second device VPN using the third mapping of the tenant name to the second tenant VPN.

17. The one or more computer-readable non-transitory storage media of claim 15, the operations further comprising:

identifying a second tenant from the plurality of tenants, wherein:

the second tenant is associated with a second tenant VPN; and an identifier of the second tenant VPN is the same as an identifier of the first tenant VPN; and determining a mapping of the second tenant VPN to a second device VPN, wherein an identifier of the second device VPN is different than an identifier of the first device VPN.

18. The one or more computer-readable non-transitory storage media of claim 15, the operations further comprising:

scheduling traffic based on forwarding classes and bandwidth distribution among interface queues;

scheduling the traffic and the bandwidth distribution among VPN groups; and shaping the traffic.

19. The one or more computer-readable non-transitory storage media of claim 15, the operations further comprising:

onboarding the first tenant on a router;

determining that the first tenant is assigned to the controller; and establishing a control connection to the controller.

20. The one or more computer-readable non-transitory storage media of claim 15, wherein:

the global device VPN space is common across all multi-tenant routers of a software-defined wide area network (SD-WAN) network; and each time a new tenant VPN is created, the new tenant VPN is allocated a next unused device VPN from the global device VPN space.

* * * * *